United States Patent [19]

Wardlaw

[11] Patent Number: 5,391,112
[45] Date of Patent: Feb. 21, 1995

[54] VEHICLE AIR INLET AND FILTER ASSEMBLY

[75] Inventor: Kenneth L. Wardlaw, Southfield, Mich.

[73] Assignee: General Motors Corporation, Detroit, Mich.

[21] Appl. No.: 222,060

[22] Filed: Apr. 4, 1994

[51] Int. Cl.$^6$ .............................................. B60H 3/06
[52] U.S. Cl. ...................................... 454/139; 55/500; 454/158
[58] Field of Search ................ 55/385.2, 500; 454/139, 454/158

[56] References Cited

U.S. PATENT DOCUMENTS

| | | | |
|---|---|---|---|
| 2,182,716 | 12/1939 | Brent | 454/139 |
| 2,185,486 | 1/1940 | Wahlberg | 454/139 |
| 2,964,038 | 12/1960 | Silverman | 55/500 X |
| 4,671,810 | 6/1987 | Dietzsch et al. | 55/309 |
| 4,779,517 | 10/1988 | Weller et al. | |
| 4,925,468 | 5/1990 | Kishi et al. | 55/467 |
| 5,009,392 | 4/1991 | Ostrand | 251/180 |

FOREIGN PATENT DOCUMENTS

| | | | |
|---|---|---|---|
| 137222 | 6/1987 | Japan | 454/158 |
| 186414 | 7/1989 | Japan | 454/139 |

*Primary Examiner*—Harold Joyce
*Attorney, Agent, or Firm*—Patrick M. Griffin

[57] ABSTRACT

A vehicle ventilation system has a combined air inlet and filter assembly that combines the functions of selectively inletting fresh or recirculated air to the system, while filtering both, and also providing for easy filter change. An arch shaped inlet housing located upstream of the blower has two inlets lying on a cylindrical surface, one opening to the outside and one to the inside. A swingable cover moves over the outside of the inlet housing, blocking or opening one inlet at a time, but leaving the interior of the inlet housing unobstructed. A filter is fed through one of the inlet openings to take on the arch shape of the interior of the housing, covering both inlet openings so as to filter both inlet air selections. The filter may be easily removed and replaced.

3 Claims, 2 Drawing Sheets

VEHICLE AIR INLET AND FILTER ASSEMBLY

This invention relates to vehicle ventilation in general, and specifically to a combined filter and air inlet assembly for such a system that both selects between outside (fresh) or inside (recirculated) air, filters both, and allows for easy filter access.

BACKGROUND OF THE INVENTION

Vehicle heating, cooling and ventilation systems incorporate a blower fan to force air across various heat exchangers to heat or cool the air, or may intake untreated air, after which it is forced into a duct system for distribution to the vehicle interior. Upstream of the fan, inlet air is drawn into the system, either fresh air from outside of the vehicle, or recirculated air from inside the vehicle. When the operator selects between fresh or recirculated inlet air, a flapper type valve door pivoted inside an inlet duct switches to block either an outside opening (generally located under a screen at the lower edge of the windshield) or an inside opening inlet (generally located under the vehicle interior instrument panel).

Typically, air inlets to the fan have simply drawn air directly into the system, whether from outside or inside, without an interposed intake filter. With an increasing emphasis on interior comfort options such as multi zone temperatures and individual driver-passenger controls, it has been proposed to filter the inlet air, just as combustion air has always been filtered. Patents in the area of inlet air filtration often disclose filters located under the vehicle hood, accessible from outside the vehicle, upstream of the fan. An example may be seen in U.S. Pat. No. 4,779,468. Such designs act to filter only outside air. Others show a filter located more or less in a flat plane, just downstream of the fan, so that air drawn in by the fan, through whatever inlet opening, is filtered. An example may be seen in U.S. Pat. No. 4,925,468, FIG. 2, where a flat filter 120 inserted into a slot 108 in duct 103, downstream of fan 106, filters air pulled by fan 106 through either fresh air inlet 104 or recirculated inlet 105, as selected by flapper door 102. A drawback of such a design is that the space available for insertion of the flat filter into the duct may often be limited, requiring that the filter be broken up into two or more hinged sections, so as to be installed section by section. Even if access to the system were better at a location upstream of the blower 106, nearer to the two inlets 104 and 105, interference by the flapper door 102 would prevent the location of a filter inboard of the inlets 104 and 105.

SUMMARY OF THE INVENTION

The subject invention overcomes the drawbacks outlined above by providing a new air inlet and filter assembly in which a single piece filter is located upstream of the blower, adjacent to and serving both air inlets to the system, but without interfering with the air inlet selection valve, and also providing for relatively simple filter changing.

In the preferred embodiment disclosed, a specially designed inlet housing is located upstream of the blower module. The inlet housing has a generally arch shaped body with two opposed air inlets, an outside air inlet opening to the vehicle exterior, and an inside air inlet opening to the vehicle interior. A semi cylindrical valve cover is pivoted to the outside of the inlet housing body, and swings back and forth to uncover either inlet opening, leaving the hollow interior of the inlet housing body unobstructed. A one piece filter is long enough to cover both inlets when bent into a matching arch shape inside the inlet housing. The filter is narrow enough to be fed through the accessible inside air inlet into the inlet housing, or removed therefrom.

DESCRIPTION OF THE PREFERRED EMBODIMENT

These and other features of the invention will appear from the following written description, and from the drawings, in which.

Figure 1:
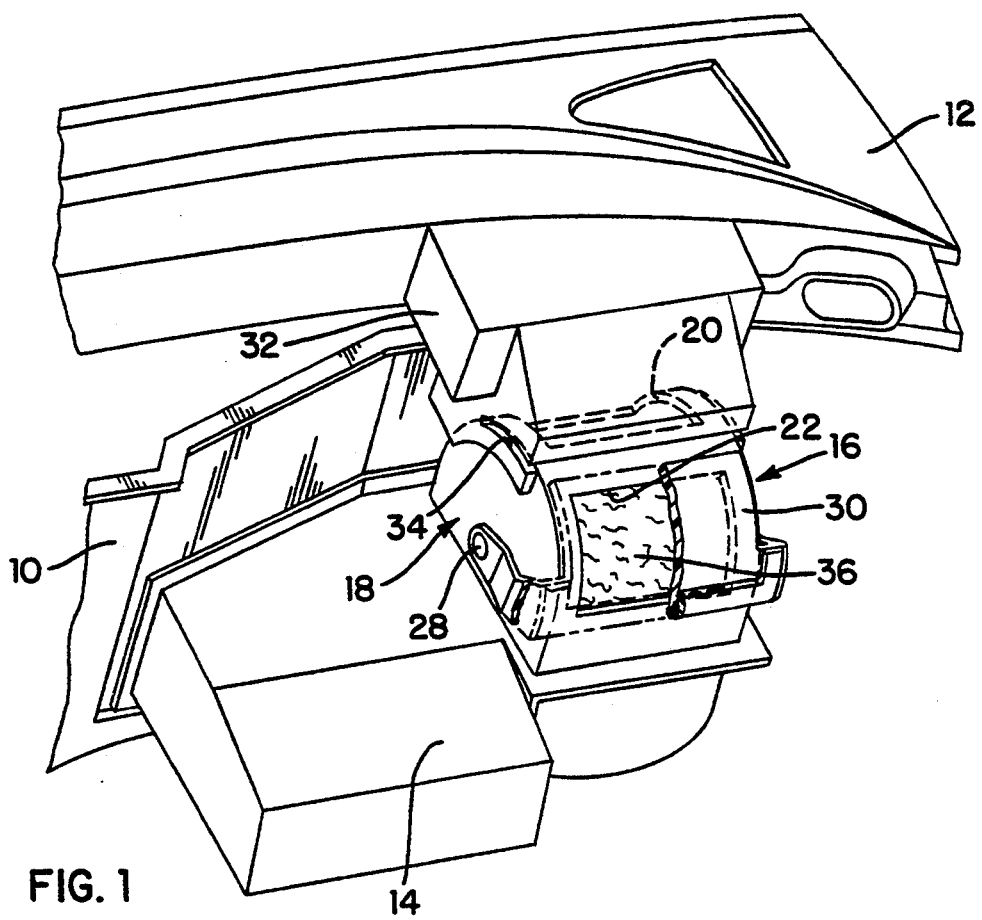
FIG. 1 is a perspective of a portion of a vehicle body showing a windshield plenum, interior dash panel, fan module and inlet housing with a section of the valve cover broken away.

Referring first to FIG. 1, a typical vehicle body, near the front of the vehicle, is roughly divided into an interior and exterior space by a dash panel 10, which also serves as a foundation to which various components of a heating, cooling and ventilation system would be mounted. Above dash panel 10, and located just outside and below the lower edge of the non illustrated windshield, is a so called plenum or fresh air screen 12. The plenum 12 is not the direct inlet to the ventilation system, but fresh, outside air would be drawn through it initially. The plenum 12 screens out leaves and large objects, but is not a filter for small particulates. A blower or fan module 14, also often referred to as an HVAC module, is secured to dash panel 10. A conventional fan, heater core and evaporator inside of module 14 heats or cools air drawn into module, after which it is directed into a conventional duct system for distribution. Or, ambient air may be pulled into the system for simple ventilation.

Figure 2:
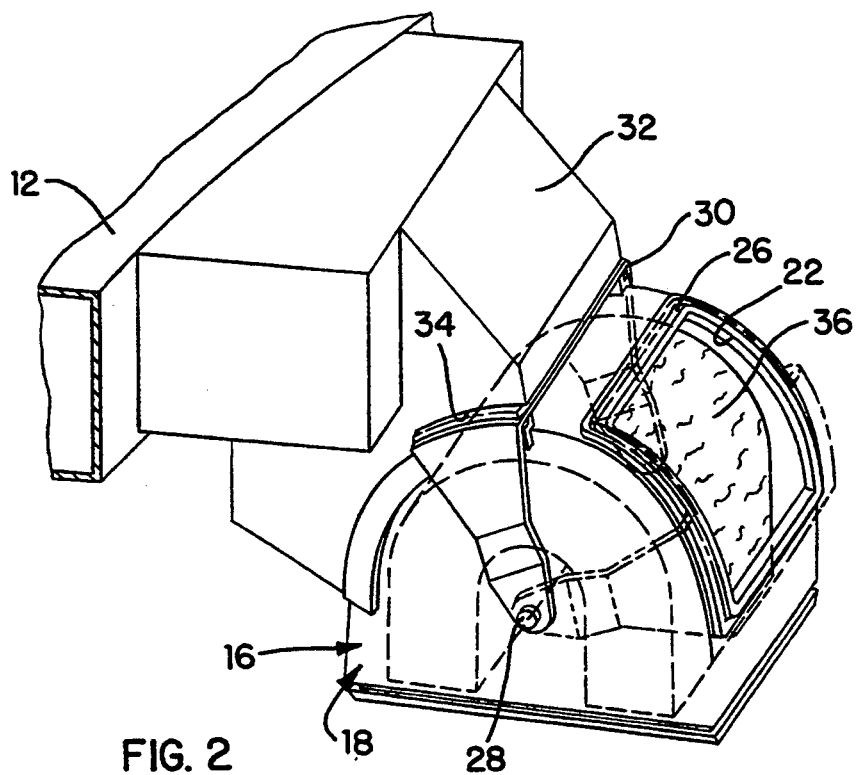
FIG. 2 is a perspective of just the inlet housing and part of the plenum.
Figure 3:
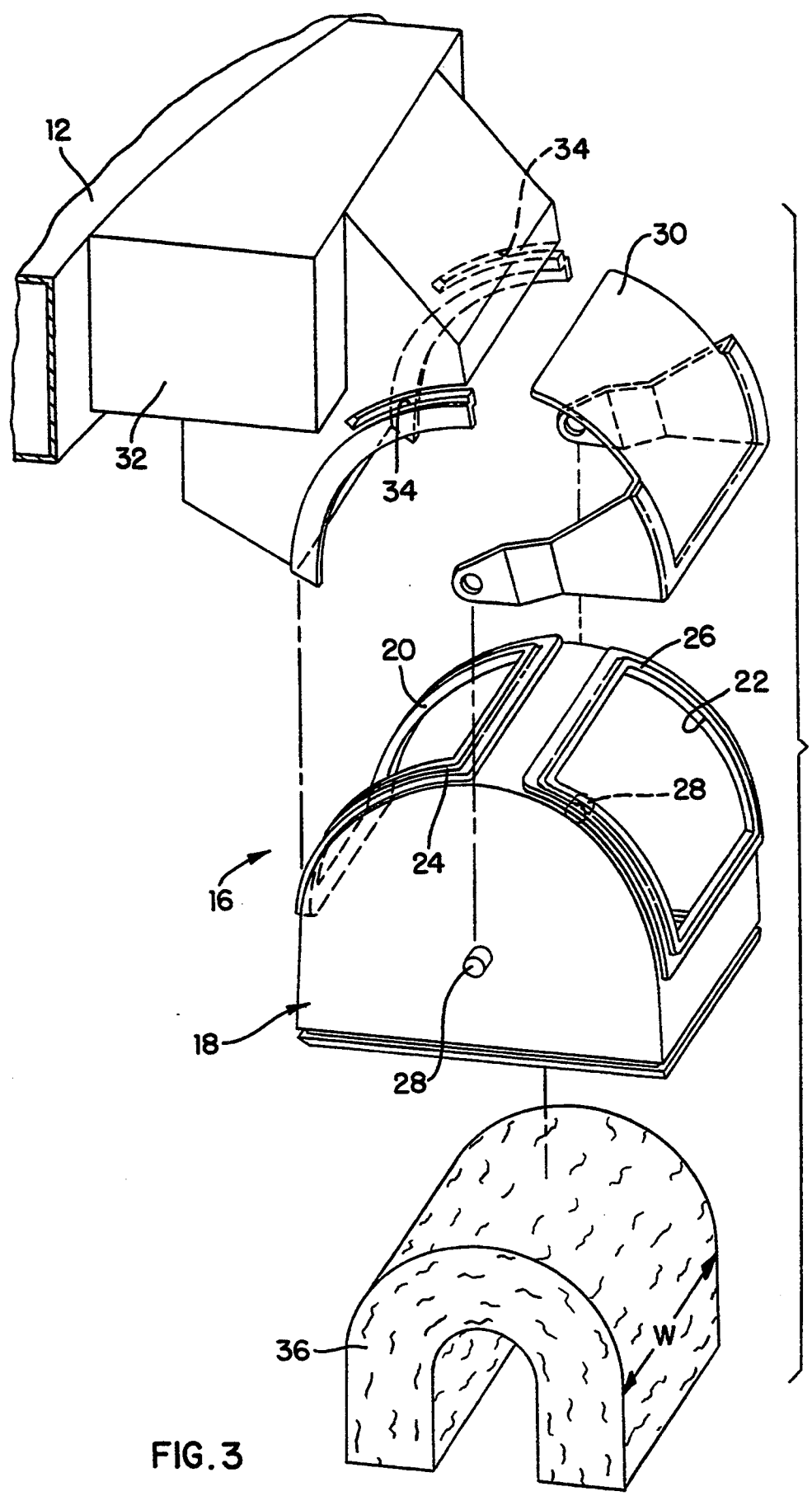
FIG. 3 is an exploded perspective view of the housing, valve cover, and filter.

Referring next to FIGS. 2 and 3, the invention comprises an air inlet and filter assembly, indicated generally at 16, which combines the functions of selectively inleting air to the system and filtering it. A generally arch shaped housing 18, which has a base edge secured air tight to HVAC module 14, has a pair of opposed, arcuate rectangular inlets on each side. These comprise a fresh air or outside air inlet 20 facing the vehicle exterior, and a recirculating or inside air inlet 22 opening to the vehicle interior. Each inlet 20 and 22 is approximately as wide as the entire housing 18, and covers almost ninety degrees of an imaginary cylindrical surface on which they both lie. Each inlet 20 and 22 is also surrounded by a respective coaming like seal 24 and 26. A pair of trunnions 28 are centered on the axis of the same imaginary cylinder. A semi cylindrical valve cover 30 is pivoted to the trunnions 28 so as to slide back and forth over the exterior of housing 18 in a swinging motion. Valve cover 30 has an area substantially equal to either inlet 20 or 22, and can therefore cover either, but not both at once, while remaining in light compression with the respective seals 24 or 26. The outside inlet 20 opens to the vehicle exterior indirectly, through an auxiliary inlet duct 32 which in turn opens at one end under plenum 12. The other end of inlet duct 32 fits over housing 18, straddling the outside air inlet 20, and is arcuately slotted on each side at 34 so as to allow valve cover 30 to slide freely through it and over outside air inlet 20. The last component is a simple, single piece filter 36 which can be bent into the arch shaped shown, so as to fit closely inside of housing 18, and is long enough to cover both inlets 20 and 22. Filter 36 has a width W substantially equal to the side to side width of inside inlet 22.

Referring next to FIGS. 1 and 2, the operation of inlet and filter assembly 16 is relatively simple, both in terms of daily operation and servicing. Valve cover 30 would be moved by a suitable actuator, such as the vacuum actuators now typically used to move the flapper doors in conventional heating systems. Valve cover 30 moves only over the outside of housing 18, however, and leaves the hollow interior entirely unobstructed. Therefore, when outside inlet 20 is covered and inside inlet 22 is uncovered, filter 36 can be inserted end first through inside inlet 22 and fed into housing 18. If filter 36 has even moderate stiffness and resilience, it should easily take on the arch shape of the housing 18, resiliently biasing itself outwardly against and covering both inlets 20 and 22. If it is a softer material, then it could be given a perimeter frame of resilient plastic, which could even be given a precurve. When filter 36 needs replacement, it would be removed in one piece through the same inside inlet 22. Although not indicated in FIG. 2, both HVAC module 14 and housing 18 would be located behind some other interior trim panel that covers dash panel 10. Access would have to be provided through that trim panel or panels to reach inlet 22 for filter servicing. Interior trim panel access has been routinely provided in the past in production vehicles for electrical components, such as fuse boxes and the like. Typically, whatever part of the interior trim panel happens to cover the item to be serviced is simply hinged or otherwise made easily removable, and the same obvious expedient would apply here.

Variations in the disclosed embodiment could be made. Any valve member that selectively covered and uncovered the two housing inlet openings from the exterior, while leaving the openings unobstructed inboard, would allow the one piece filter to be easily installed and removed from one of the openings. A valve cover that slides back and forth over the exterior is perhaps the simplest configuration for such as assembly. A box shaped inlet housing in which the inlet openings lay in a plane, rather than on a cylindrical surface, could be provided with a sliding cover that slid straight back and forth, and a one piece filter could be fed through one of the inlet openings, as well. The swingable valve cover disclosed is a variant of the basic sliding motion. The arch shaped housing and arcuate openings is a particularly advantageous embodiment, since it allows the filter to rest inside the inlet housing with a self biasing, retaining action, and since the inlet openings, being in opposed quadrants of the cylindrical surface, face toward the vehicle interior and exterior in a convenient orientation. Therefore, it will be understood that it is not intended to limit the invention to just the embodiment disclosed.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a vehicle having an interior and exterior space defined by a vehicle body, and a fan powered heating, cooling and ventilation module, a combined air inlet and filter assembly for said module, comprising,
   an inlet housing located upstream of said module, and having a generally hollow interior with an outside air inlet opening to the vehicle exterior and an opposed inside air inlet opening to the vehicle interior,
   a valve cover operably associate with inlet housing so as to be moved over the outside of said inlet housing from a first position covering said inside air inlet to a second position covering said outside air inlet, and,
   a filter having a length sufficient to cover both of said inlet openings when placed inside said housing and a width capable of fitting through said inside inlet opening when uncovered,
   whereby, said filter may be inserted and removed in one piece into said inlet housing through said inside inlet opening, while selectively filtering either exterior or interior air, depending upon said valve cover position.

2. In a vehicle having an interior and exterior space defined by a vehicle body, and a fan powered heating, cooling and ventilation module, a combined air inlet and filter assembly for said module, comprising,
   an inlet housing located upstream of said module, and having a generally hollow interior with an outside air inlet opening to the vehicle exterior and an opposed inside air inlet opening to the vehicle interior,
   a valve cover slidably mounted to said inlet housing so as to be slide over the outside of said inlet housing from a first position covering said inside air inlet to a second position covering said outside air inlet, and,
   a filter having a length sufficient to cover both of said inlet openings when bent into an arch shape and a width capable of fitting through said inside inlet opening when uncovered,
   whereby, said filter may be inserted and removed in one piece into said inlet housing through said inside inlet opening, while selectively filtering either exterior or interior air, depending upon said valve cover position.

3. In a vehicle having an interior and exterior space defined by a vehicle body, and a fan powered heating, cooling and ventilation module, a combined air inlet and filter assembly for said module, comprising,
   an inlet housing located upstream of said module, and having a generally arch shaped body with an outside air inlet opening to the vehicle exterior and an opposed inside air inlet opening to the vehicle interior, each of which lies substantially on a cylindrical surface,
   a semi cylindrical valve cover pivoted to said inlet housing so as to swing over the outside of said inlet housing from a first position covering said inside air inlet to a second position covering said outside air inlet, and,
   a filter having a length sufficient to cover both of said inlet openings when bent into an arch shape and a width capable of fitting through said inside inlet opening when uncovered,
   whereby, said filter may be inserted and removed in one piece into said inlet housing through said inside inlet opening, while selectively filtering either exterior or interior air, depending upon said valve cover position.

* * * * *